(12) United States Patent
Bruch (10) Patent No.: US 9,368,829 B2
(45) Date of Patent: Jun. 14, 2016

(54) BATTERY STACK HAVING INTERLEAVED ANODE AND CATHODE

(71) Applicant: Pacesetter, Inc., Sunnyvale, CA (US)

(72) Inventor: Russell Bruch, Greenville, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 689 days.

(21) Appl. No.: 13/756,394

(22) Filed: Jan. 31, 2013

(65) Prior Publication Data

US 2014/0212734 A1  Jul. 31, 2014

(51) Int. Cl.
*H01M 10/04* (2006.01)
*H01M 2/26* (2006.01)

(52) U.S. Cl.
CPC ............ *H01M 10/045* (2013.01); *H01M 2/266* (2013.01); *Y10T 29/4911* (2015.01); *Y10T 29/49108* (2015.01)

(58) Field of Classification Search
CPC  H01M 10/045; H01M 10/0431; H01M 2/266
USPC ......................................................... 429/160
See application file for complete search history.

(56) References Cited

U.S. PATENT DOCUMENTS

| 6,045,943 A | * | 4/2000 | Nowaczyk | .......... | H01M 2/0285 |
| | | | | | 429/127 |
| 6,524,453 B1 | * | 2/2003 | De Souza | .................. | C25B 9/04 |
| | | | | | 204/267 |

FOREIGN PATENT DOCUMENTS

WO         2006/050393 A3    5/2006

* cited by examiner

*Primary Examiner* — Sarah A Slifka
*Assistant Examiner* — Brent Thomas
(74) *Attorney, Agent, or Firm* — Theresa A. Raymer (57) ABSTRACT

A cathode element is formed as a continuous single element with a plurality of cathode leaves connected by cathode bridges. An anode element is similarly formed as a continuous single element with a plurality of anode leaves connected by anode bridges. The cathode element and anode element can be aligned and interleaved at spaces between adjacent leaves. The resulting battery pre-stack can then be folded along its bridges in alternating directions to form a battery stack whose layers alternate between an anode and cathode, and which requires minimal components and minimal or no welds.

17 Claims, 6 Drawing Sheets

BATTERY STACK HAVING INTERLEAVED ANODE AND CATHODE

BACKGROUND

1. Technical Field

The disclosure relates to a battery, and specifically to a battery having an improved stack design for compact profile and ease of manufacturing.

2. Related Art

Batteries are commonplace in a wide variety of electrical applications. Improvements in battery packaging efficiency are constantly being sought in order to reduce device size, as well as to allow for more active material to be inserted into an allotted volume to achieve better longevity and performance. This is particularly true in implantable medical devices (IMD's) such as implantable cardioverter defibrillators (ICD's) where physical size is a critical design element. In many IMD applications, the battery occupies a significant portion of the overall IMD volume. In order to minimize the size of the IMD, it is desirable to minimize the size and/or maximize the energy density of the battery.

Batteries are commonly manufactured in a rolled cell format (sometimes referred to as a "jelly-roll"). In this format, a long anode and a long cathode are brought together and rolled into a cylinder to create the battery stack. Because of the simplicity of this packaging method, it requires very little manufacturing and is therefore a low cost solution. However, its cylindrical shape can be inefficient in space-constrained applications such as IMD's. Specifically, when used in a rectangular package format, the cylindrical battery wastes large portions of space within the device.

As a more space-efficient alternative to the rolled cell format for applications such as IMD's, a stacked cell format may instead be used. The stacked format requires multiple cathode assemblies and multiple anode assemblies to be alternately stacked on top of one another. The multiple cathode assemblies must then be welded together along an edge of the stack, and the multiple anode assemblies must be welded together along another edge of the stack. Consequently, although this design provides greater space efficiency, it requires more parts and more assembly, making it more costly and complex to manufacture.

BRIEF SUMMARY

Disclosed is a battery stack that requires minimal components and minimal or no welds.

In an embodiment, a cathode element is formed as a continuous single element with a plurality of cathode leaves connected by cathode bridges. An anode element is similarly formed as a continuous single element with a plurality of anode leaves connected by anode bridges. The cathode element and anode element are aligned and interleaved at slits between adjacent leaves to create a battery pre-stack. The battery pre-stack is folded along its bridges in alternating directions to form the battery stack having layers that alternate between an anode and cathode.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many battery and/or capacitor manufacturing methods without departing from the spirit and scope of the present disclosure.

An Exemplary Battery Stack and Method of Manufacturing Therefor

Figure 1:
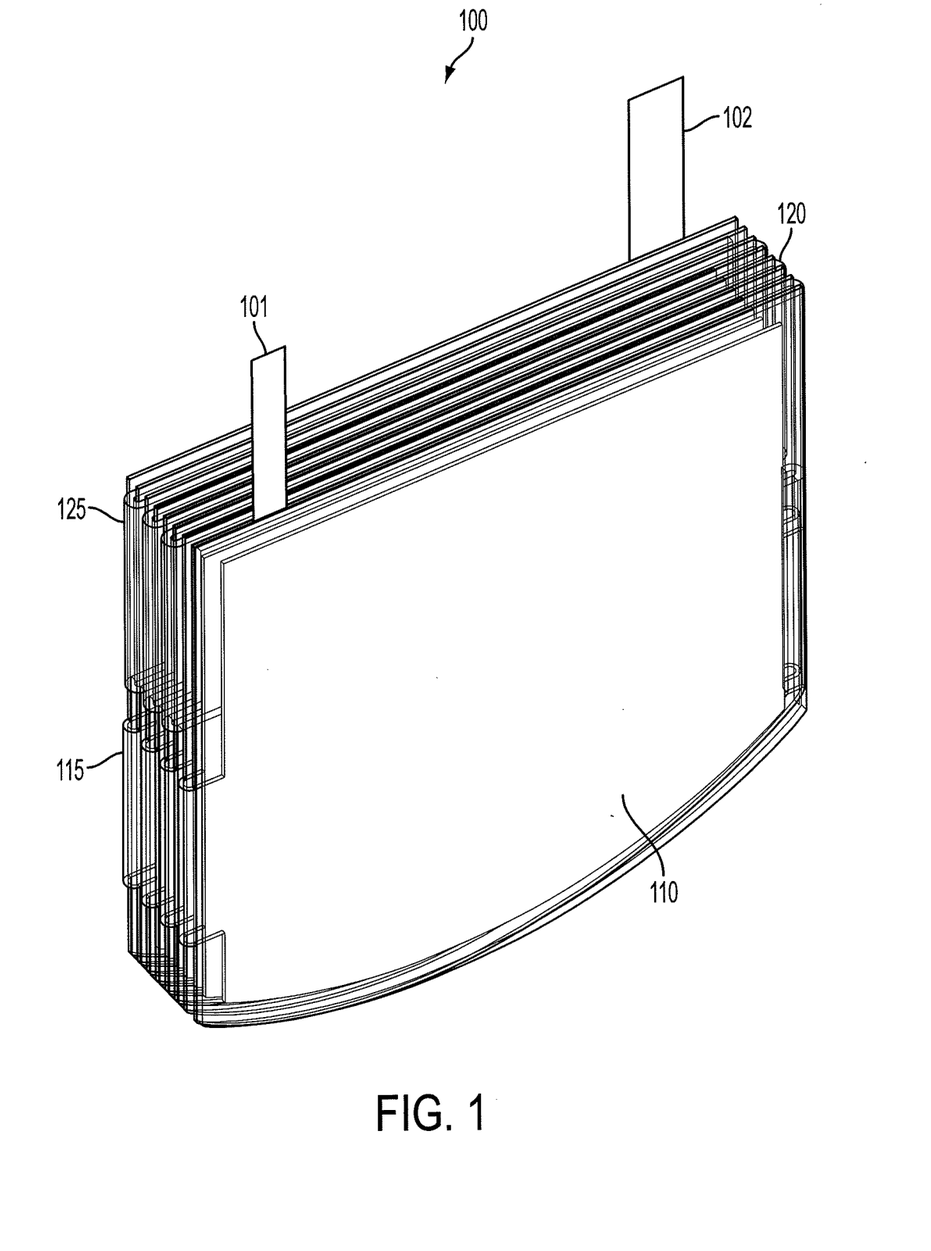
FIG. 1 illustrates a three-dimensional perspective view of an exemplary battery stack.

FIG. 1 illustrates a three-dimensional perspective view of an exemplary battery stack 100. The battery stack 100 has a stacked cell format to provide a compact profile, but requires minimal welds and components to allow for easy manufacturing.

As shown in FIG. 1, the battery stack includes a plurality of anode leaves 110 alternately stacked with a plurality of cathode leaves 120. The cathode leaves 120 are integrally interconnected via a plurality of cathode bridges 125. Similarly, the anode leaves 110 are integrally interconnected via a plurality of anode bridges 115. In addition, a cathode tab 101 can be connected to one of the cathode leaves 110 in the stack 100 (e.g., a first cathode leaf), and an anode tab 102 can be connected to one of the anode leaves 120 in the stack 100 (e.g., a last anode leaf).

The integrated structure of the cathode leaves 120 via the cathode bridges 125, as well as the integrated structure of the anode leaves 110 via the anode bridges 115, allows for a stacked cell format to be achieved at a manufacturing cost and complexity similar to that of a rolled cell format, as will be shown in detail with respect to FIGS. 2-5, below.

Cathode Element and Preparation

Figure 2A:
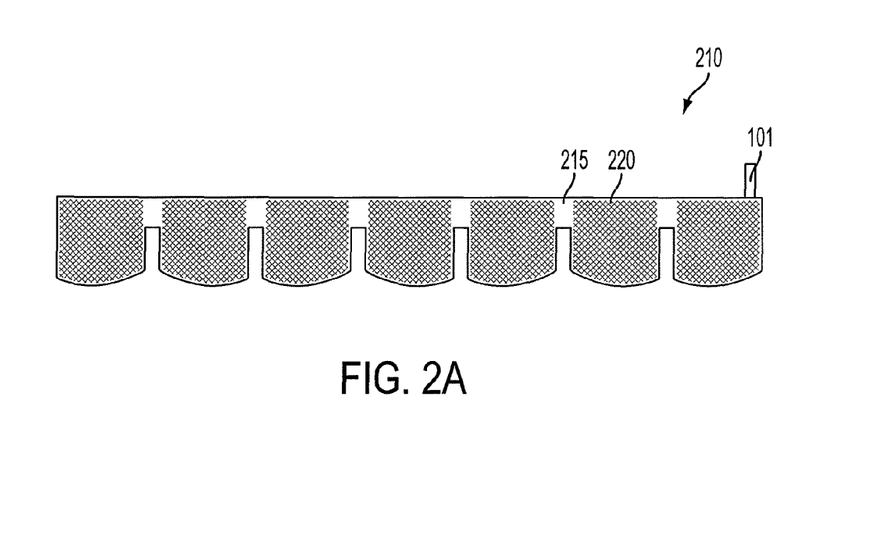
FIGS. 2A-2C illustrate plan views of an exemplary cathode element and its preparation.
Figure 2B:
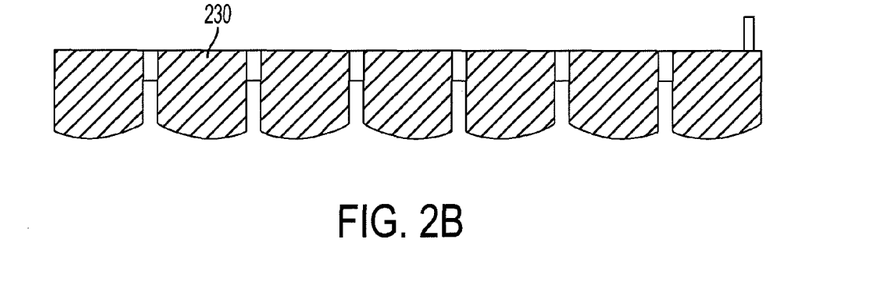
Figure 2C:
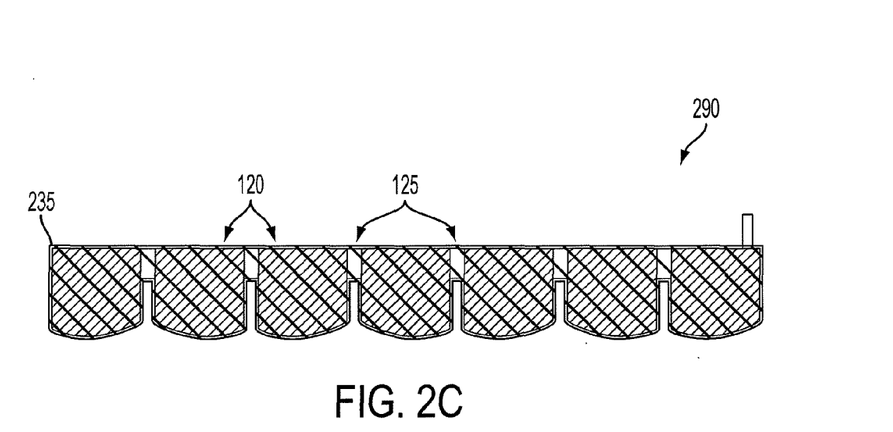

FIGS. 2A-2C illustrate plan views of an exemplary cathode element 290 and its preparation. The cathode element 290 includes a plurality of cathode leaves 120 integrally connected by cathode bridges 125.

As shown in FIG. 2A, a first step in the preparation of the cathode element 290 includes the preparation of a cathode collector 210. The cathode collector 210 includes a cathode tab 101 and a plurality of cathode collector leaves 220 integrally connected via cathode collector bridges 215. Although only a single cathode tab 101 is illustrated, it should be understood that multiple tabs 101 can be used in order to reduce internal resistance.

In an embodiment, the cathode collector leaves 220 have a mesh or grating structure, whereas the cathode collector bridges 215 have a solid structure. Configuring the cathode collector bridges 215 to have a solid structure reduces the internal resistance without increasing cost. However, in an embodiment, the cathode collector bridges 215 may be porous, particularly when made using stamped expanded metal or perforated metal. The cathode collector leaves 220 constitute areas that will become the cathode leaves 120, and the cathode collector bridges 215 constitute areas that will become the cathode bridges 125.

In an embodiment, the cathode collector 210 is a single continuous metal element. In order to achieve this, the cathode collector 210 can be molded, or cut or stamped, for example, from a single sheet of metal. In an embodiment, the cathode collector 210 is made of titanium, for example. By preparing the cathode collector 210 as a single continuous element, minimal or no welding will be required in the assembly of the battery stack, thereby minimizing complexity and cost.

In addition to being formed as a single continuous sheet, the cathode collector 210 should also be formed with similarly-shaped leaves 220. As shown in FIG. 2A, the leaves 220 need not be symmetrical or identically shaped. However, because of the folding that will occur later in the battery stack preparation, each cathode collector leaf 220 is preferably a mirror image of an adjacent cathode collector leaf 220. For example, the right-most cathode collector leaf 220 has a shape that mirrors that of the cathode collector leaf 220 to its immediate left. By forming all the cathode collector leaves 220 to share this mirror-image property, each of the leaves will align with each other when folded, as described below.

As shown in FIG. 2B, once the cathode collector 210 has been formed, a cathode material 230 is laminated over the cathode collector 210. In an embodiment, the cathode material 230 is formed only over the cathode collector leaves 220. In other words, the cathode material 230 is formed only on the areas of the cathode collector 210 that are to become the cathode leaves 120. In another embodiment, the cathode material 230 can be formed both on the cathode collector leaves 220 and the cathode collector bridges 215. However, the cathode material 230 in such an embodiment should be carefully chosen, and the manufacturing process carefully designed, to prevent cracking or other degradation to the cathode material 230 at the cathode collector bridges 215 during the folding of the cathode element 290, discussed below. In an embodiment, the cathode material 230 is composed of silver vanadium oxide (SVO) or manganese dioxide ($MNO_2$).

Once the cathode material 230 has been formed on the cathode collector 210, the combined element is coated (e.g., bagged) in an insulating or separating material such as polypropylene/polyethylene (PP/PE) to form a shut down separator 235. The separator 235 is formed over cathode collector leaves 220 that include the cathode material 230 in order to form the cathode leaves 120 of the cathode element 290. The separator is also formed over the cathode collector bridges 215 in order to form the cathode bridges 125 of the cathode element 290. A heat seal operation seals the separator 235 on a front surface to the separator 235 at an opposing surface so as to encase the cathode collector 210 and cathode material 230 in order to complete the preparation of the cathode element 290.

Anode Element and Preparation

Figure 3A:
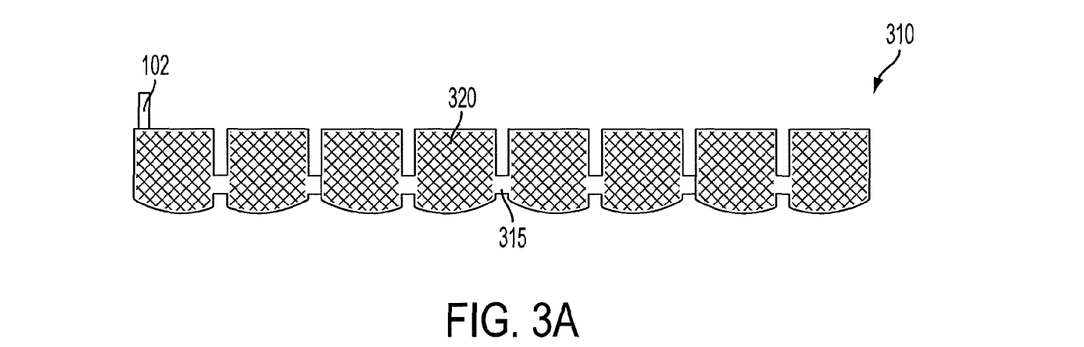
FIGS. 3A-3C illustrate plan views of an exemplary anode element and its preparation.
Figure 3B:
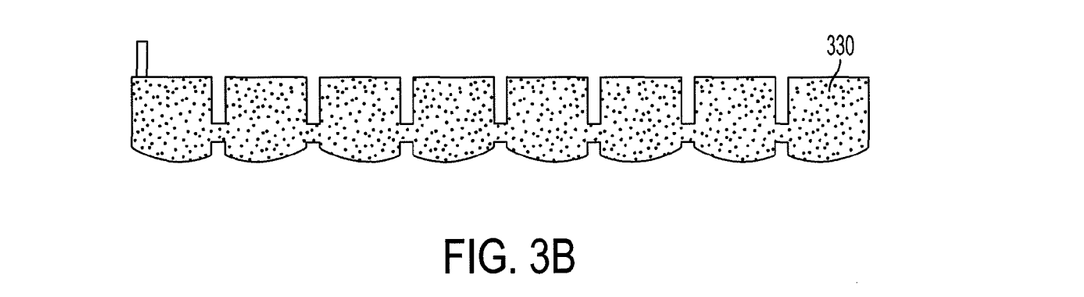
Figure 3C:
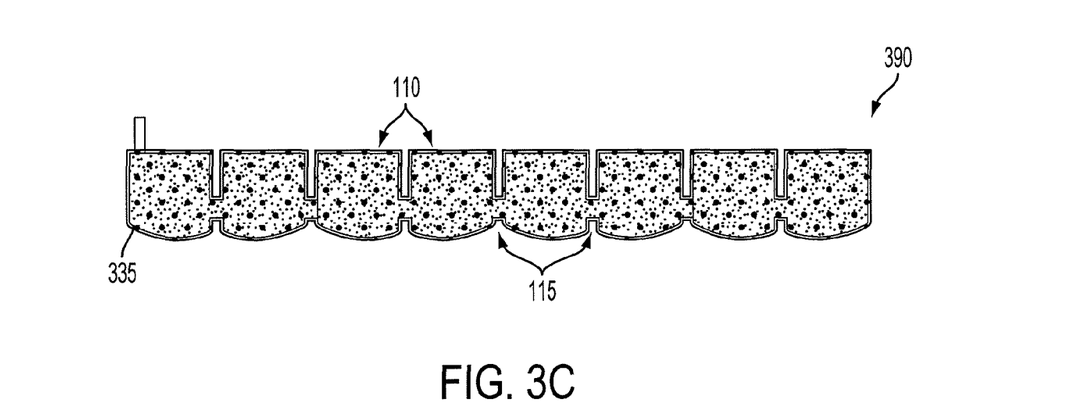

FIGS. 3A-3C illustrate plan views of an exemplary anode element 390 and its preparation. The anode element 390 includes a plurality of anode leaves 110 integrally connected by anode bridges 115.

As shown in FIG. 3A, a first step in the preparation of the anode element 390 includes the preparation of an anode current collector 310. The anode current collector 310 includes an anode tab 102 and a plurality of anode current collector leaves 320 integrally connected via anode current collector bridges 315. Although only a single anode tab 102 is illustrated, multiple tabs 102 can be used depending on application.

In an embodiment, the anode current collector leaves 320 have a mesh or grating structure, whereas the anode current collector bridges 315 have a solid structure. As with the cathode collector bridges 215, configuring the anode current collector bridges 315 to have a solid structure reduces the internal resistance without increasing cost. However, in an embodiment, the anode current collector bridges 215 may be porous, particularly when made using stamped expanded metal or perforated metal. The anode current collector leaves 320 constitute areas that will become the anode leaves 110, and the anode current collector bridges 315 constitute areas that will become the anode bridges 115.

In an embodiment, the anode current collector 310 is a single continuous metal element. In order to achieve this, the anode current collector 310 can be molded, or cut or stamped from a single sheet of metal. In an embodiment, the anode current collector 310 is made, for example, of one of 304I stainless steel, 316I stainless steel, or nickel. By preparing the anode current collector 310 as a single continuous element, minimal or no welding will be required in the assembly of the battery stack, thereby minimizing complexity and cost.

Like the cathode collector 210, the anode current collector 310 is preferably also formed with similarly-shaped leaves 320. In addition, those leaves are preferably shaped substantially the same as the cathode leaves 120. Therefore, in this exemplary embodiment, each anode current collector leaf 320 will have shapes that mirror adjacent anode current collector leaves 320, and are also shaped similarly to the cathode collector leaves 220. The similarity in shape between the anode current collector leaves 320 and the cathode collector leaves 220 can be seen by comparing FIGS. 3A and 2A.

In an embodiment, the anode current collector 310 is formed so as to have one additional anode current collector leaf 320 when compared to the cathode collector 310. In the depicted examples, the cathode collector 210 has seven leaves 220, whereas the anode current collector 310 has eight leaves 320. When properly folded (discussed below), this attribute allows anode leaves to encase or "bookend" the battery stack. In other words, the final stack will have an anode layer at each exposed face.

As shown in FIG. 3B, once the anode current collector 310 has been formed, an anode material 230 is laminated over the anode current collector 310. In an embodiment, the anode material 330 is a lithium foil and is formed over both the anode current collector leaves 320 and the anode current collector bridges 315. In other words, the anode material 330 is formed on the areas of the anode current collector 310 that are to become the anode leaves 110 and on the areas of the anode current collector 310 that are to become the anode bridges 115. If, however, it is desired not to form the anode material 330 on the anode current collector bridges 315 (e.g., to avoid risk of anode material 330 cracking during the folding process), then the anode material 330 can instead be formed only over the anode current collector leaves 320.

Once the anode material 330 has been formed on the anode current collector 310, the combined element is coated (e.g., bagged) in an insulating or separating material such as polypropylene/polyethylene (PP/PE) to form a shut down separator 335. The separator 335 is formed over anode current collector leaves 320 in order to form the anode leaves 110, and over anode current collector bridges 315 in order to form the anode bridges 115 of the anode element 390. A heat seal operation seals the separator 335 on a front surface to the separator 335 at an opposing surface so as to encase the anode current collector 310 and anode material 330 in order to complete the preparation of the anode element 390.

The final anode element 390 preferably has a shape that substantially corresponds to that of the final cathode element 290. Depending on application, the similarity between the shape of the anode leaves 110 and the shape of the cathode leaves 120 can be adjusted.

Although the anode element 390 and cathode element 290 preferably have substantially the same shape, there are exceptions. For example, the anode element 390 can include an additional anode leaf 110 compared to the number of cathode leaves 120. In addition, the cathode bridges 125 and the anode bridges 115 are preferably positioned on the cathode element 290 and the anode element 390, respectively, such that they do not conflict with one another when the cathode element 290 and the anode element 390 are aligned in an overlapping fashion. For example, as shown in FIGS. 2C and 3C, the cathode bridges 125 are positioned along a top edge of the cathode element 290, whereas the anode bridges 115 are positioned near an opposing edge. Further, the widths of the bridges 125 and 115 may be positioned such that they do not interfere with one another (upon folding and stacking as described below) when they are formed on the same edge.

Battery Stack and Assembly

Figure 4A:
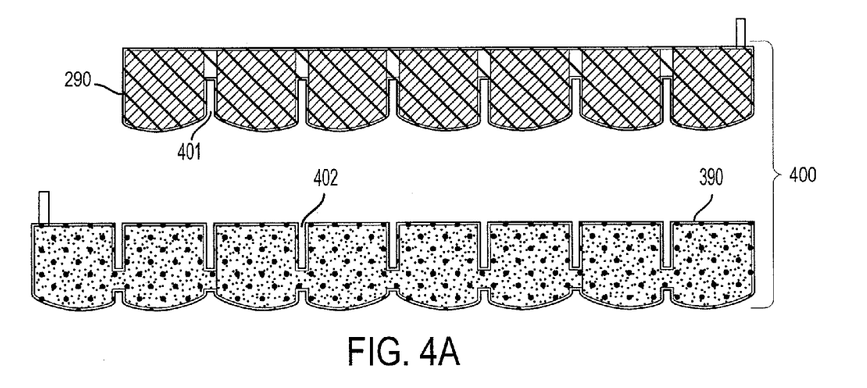
FIGS. 4A-4C illustrate perspective views of an exemplary battery pre-stack and its assembly.
Figure 4B:
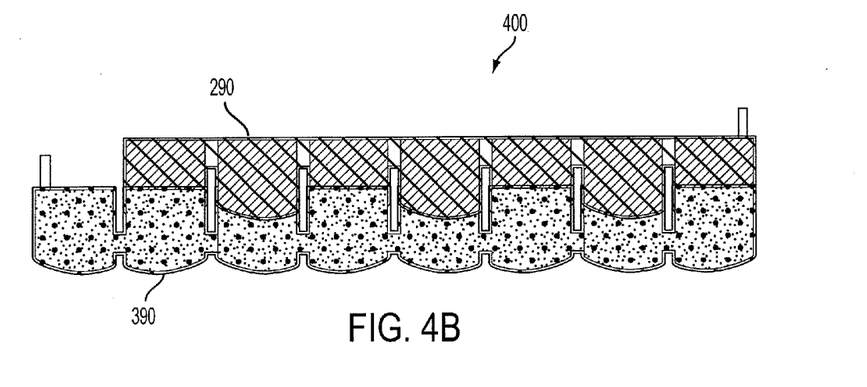
Figure 4C:
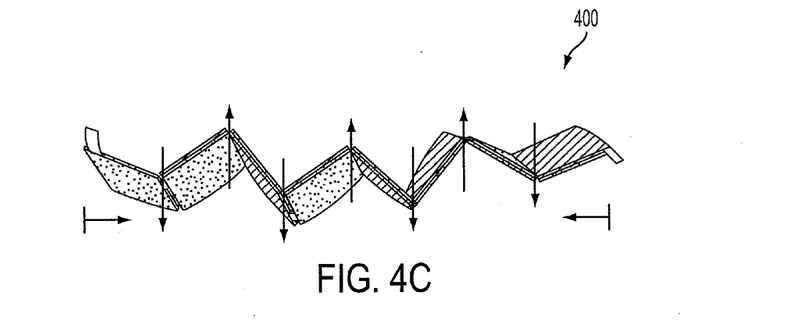

FIGS. 4A-4C illustrate perspective views of an exemplary battery pre-stack 400 and its assembly. The battery pre-stack 400 includes the cathode element 290, and includes the anode element 390.

In order to assemble the battery pre-stack 400, the cathode element 290 is aligned with the anode element 390. In order to properly align the cathode element 290 and the anode element 390, an end cathode leaf (e.g., the rightmost cathode leaf or the leftmost cathode leaf) should be positioned corresponding to a similarly shaped end anode leaf. As shown in FIG. 4A, the cathode element 290 corresponds in shape to the anode element 390 when aligned along the rightmost edge.

The alignment should also be performed such that slits 401 (i.e., spaces formed between adjacent cathode leaves) of the cathode element 290 face slits 402 (i.e., spaces formed between adjacent anode leaves) of the anode element 390. Once aligned, the leaves of the cathode element 290 are interleaved with the leaves of the anode element 390 while maintaining the alignment. For example, as shown in FIG. 4B, the leaves of the cathode element 290 are placed alternately in front of and behind the leaves of the anode element 390 as the cathode element 290 and the anode element 390 are brought together. In the example shown in FIG. 4B, the leaves of the cathode element 290 are placed (in order from the aligned right edge of the elements) behind, in front of, behind, in front of, behind, in front of, and behind the corresponding leaves of the anode element 390. Because the cathode element 290 includes one fewer leaf than the anode element 390, the leftmost leaf of the anode element does not overlap a cathode element leaf. The cathode element 290 and anode element 390 are brought together in this manner until their leaves substantially overlap one another.

After the cathode element 290 and the anode element 390 are interleaved and their leaves are overlapping in a substantially aligned manner, the battery pre-stack 400 can be folded, as shown in FIG. 4C. In FIG. 4C, the battery pre-stack 400 is viewed from a longitudinal edge to illustrate the folding process.

Because the exemplary battery pre-stack 400 includes one fewer cathode element leaves than anode element leaves, the folding should be performed in order to ensure that the anode element leaves alternate with the cathode element leaves when stacked. For example, the leftmost anode leaf (having no matched cathode leaf) should be folded towards its adjacent cathode leaf. It should be understand that, in an embodiment where the number of cathode leaves equals the number of anode leaves, initial fold direction is immaterial.

The folds should continue throughout the remainder of the battery pre-stack 400 in a back-and-forth or alternating manner. In other words, if the leftmost leaf is folded upwards, the next (or resulting) leaf should be folded downwards, then upwards, then downwards, etc. This results in the bridges consecutively following the leftmost bridge being bent upwards, downwards, upwards, etc., as illustrated by the arrows in FIG. 4C.

Figure 5A:
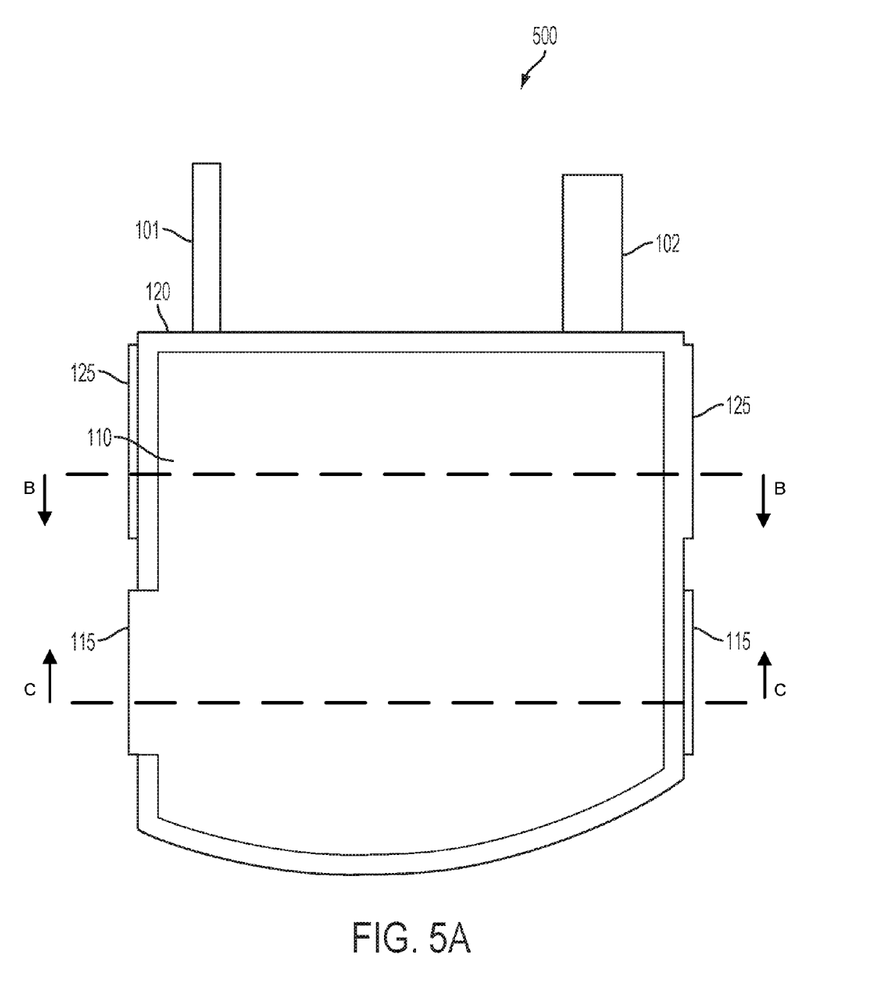
FIG. 5A is a plan view of the battery stack as viewed from a major side surface.
Figure 5B:
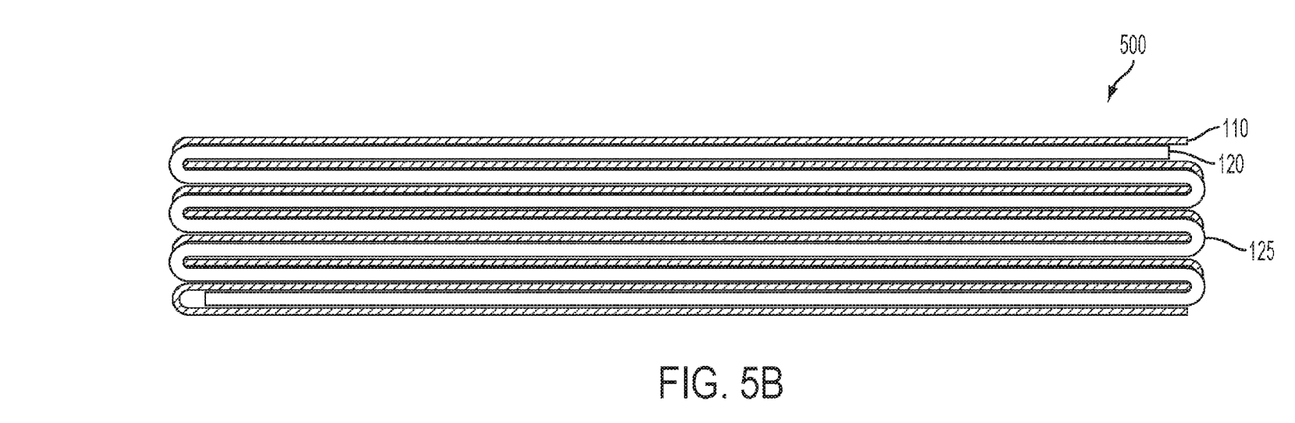
FIG. 5B is a sectional view of the battery stack taken across line BB of FIG. 5A.
Figure 5C:
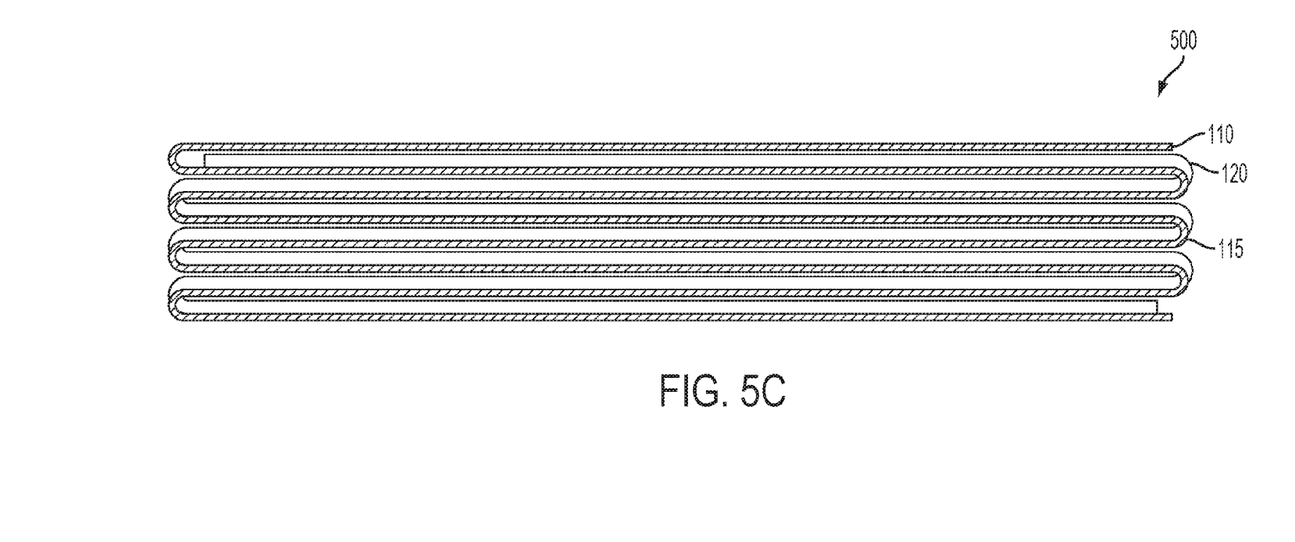
FIG. 5C is a sectional view of the battery stack taken across line CC of FIG. 5A.

FIGS. 5A-5C illustrates an exemplary battery stack 500 that results from the folding of the battery pre-stack 400. The battery stack 500 represents an exemplary embodiment of the battery stack 100. As shown in FIGS. 5A-5C, the battery stack 500 that results from the above-described process has a compact stack cell format. In addition, because the stack results from bending integrally connected bridges, welding and numbers of components are minimized.

FIG. 5A illustrates a plan view of the battery stack 500 as viewed from a major side surface. The battery stack includes a plurality of anode leaves 110 stacked and interleaved with a plurality of cathode leaves 120. The plurality of anode leaves 110 are connected via anode bridges 115, and the plurality of cathode leaves 120 are connected via cathode bridges 125. In addition, a cathode tab 101 is connected to at least one of the cathode leaves 120, and an anode tab 102 is connected to at least one of the anode leaves 110.

As shown in FIG. 5A, when cathode element 290 (FIG. 2C) and anode element 390 (FIG. 3C) are folded to form battery stack 500, the anode bridges 115 are disposed at a first position on battery stack 500, and the cathode bridges 125 are disposed at a second position on battery stack 500 so that they do not interfere with one another.

FIG. 5B is a sectional view of the battery stack 500 taken across line BB shown in FIG. 5A. As shown in FIG. 5B, the plurality of anode leaves 110 alternate with the plurality of cathode leaves 120 in the stacked direction. In addition, the cathode leaves 120 are integrally connected via cathode bridges 125.

FIG. 5C is a sectional view of the battery stack 500 taken across line CC in FIG. 5A. As shown in FIG. 5C, the anode leaves 110 and the cathode leaves 120 maintain their alternately overlapping configuration, while anode bridges 115 integrally connect the anode leaves 110.

With the configuration and assembly described above, a battery stack can be assembled with the manufacturing benefits of a rolled cell format, while having the compactness of a stacked cell format. Consequently, the exemplary battery stack 500 demonstrates significant improvement over conventional battery stack devices and methods.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A method of assembling a battery stack, the method comprising:
   preparing a cathode having a plurality of cathode leaves connected in series via a plurality of cathode bridges, wherein a slit is disposed between adjacent cathode leaves at each cathode bridge;
   preparing an anode having a plurality of anode leaves connected in series via a plurality of anode bridges, wherein a slit is disposed between adjacent anode leaves at each anode bridge;
   interleaving the plurality of cathode leaves with the plurality of anode leaves to form a pre-stack having a front side and a back side by aligning and mating the slits in the cathode with corresponding slits in the anode such that each cathode slit receives an anode bridge, each anode slit receives a cathode bridge, and the cathode leaves are placed alternatively on the front side and alternatively on the back side of the pre-stack, wherein when the plurality of cathode leaves are interleaved with the plurality of anode leaves, the cathode bridges do not overlap the anode bridges; and
   folding the pre-stack into a battery stack having alternating anode leaves and cathode leaves.

2. The method of claim 1, wherein the plurality of cathode leaves and the plurality of cathode bridges are integrally connected, and
   wherein the plurality of anode leaves and the plurality of anode bridges are integrally connected.

3. The method of claim 1, wherein preparing the cathode comprises laminating a cathode material only on areas of a cathode collector that will become the plurality of cathode leaves.

4. The method of claim 1, wherein preparing the cathode comprises laminating a cathode material on areas of a cathode collector that will become the plurality of cathode leaves and on areas of the cathode collector that will become the cathode bridges.

5. The method of claim 3, wherein preparing the cathode further comprises sealing the cathode collector and the cathode material with a separator.

6. A method of assembling a battery stack, the battery stack having a cathode element with cathode portions separated from each other by slits and connected in series via a plurality of cathode bridges, and the battery stack having an anode element with anode portions separated from each other by slits and connected in series via a plurality of anode bridges, the method comprising:
   interleaving the cathode portions of the cathode element with the anode portions of the anode element by aligning and mating the slits in the cathode element with corresponding slits in the anode element to make an interleaved battery pre-stack having a front side and a back side, the cathode portions being alternatively on the front side and alternatively on the back side of the battery pre-stack, wherein when the plurality of cathode portions with the plurality of anode portions are interleaved, the cathode bridges do not overlap the anode bridges; and
   folding the interleaved battery pre-stack to form the battery stack.

7. The method of claim 6, wherein the cathode portions and the cathode bridges are integrally connected, and
   wherein the anode portions and the anode bridges are integrally connected to form the anode element.

8. The method of claim 6, wherein the interleaving includes overlapping cathode portions with anode portions of a substantially same shape.

9. The method of claim 8, wherein the folding includes folding the interleaved battery pre-stack in alternating directions at aligned bridges.

10. The method of claim 9, wherein a number of the anode portions is one greater than a number of the cathode portions, and
    wherein a first folding direction is selected so as to cause a first anode portion to be a first layer in the battery stack.

11. The method of claim 8, wherein each of the cathode bridges are disposed along a horizontal axis of the cathode element, and
    wherein each of the anode bridges is disposed along a horizontal axis of the anode element.

12. The method of claim 7, wherein the preparing of the cathode element includes forming a cathode tab attached to a first cathode portion, and
    wherein the preparing of the anode element includes forming an anode tab attached to a last anode portion.

13. The method of claim 1 wherein the plurality of cathode bridges are positioned along a top edge of the cathode and the plurality of anode bridges are positioned along a bottom edge of the anode such that the cathode bridges do not overlap the anode bridges when the plurality of cathode leaves and the plurality of anode leaves are interleaved.

14. The method of claim 1, wherein the plurality of cathode bridges are positioned along a bottom edge of the cathode and the plurality of anode bridges are positioned along a top edge of the anode such that the cathode bridges do not overlap the anode bridges when the plurality of cathode leaves and the plurality of anode leaves are interleaved.

15. The method of claim 1, wherein the plurality of cathode bridges have a first width and the plurality of anode bridges have a second width positioned such that the cathode bridges do not overlap the anode bridges when the plurality of cathode leaves and the plurality of anode leaves are interleaved.

16. The method of claim 6, wherein the plurality of cathode bridges and the plurality of anode bridges are positioned on opposite edges of the interleaved battery pre-stack when the plurality of cathode portions with the plurality of anode portions are interleaved such that the cathode bridges do not overlap the anode bridges.

17. The method of claim 6, wherein the plurality of cathode bridges have a first width and the plurality of anode bridges have a second width positioned such that the cathode bridges do not overlap the anode bridges when the plurality of cathode portions and the plurality of anode portions are interleaved.

* * * * *